No. 652,577. Patented June 26, 1900.
M. R. YATES, F. P. LIGHT & E. HIMEBAUGH.
CORN PLANTER.
(Application filed Dec. 20, 1899.)
(No Model.) 2 Sheets—Sheet 1.
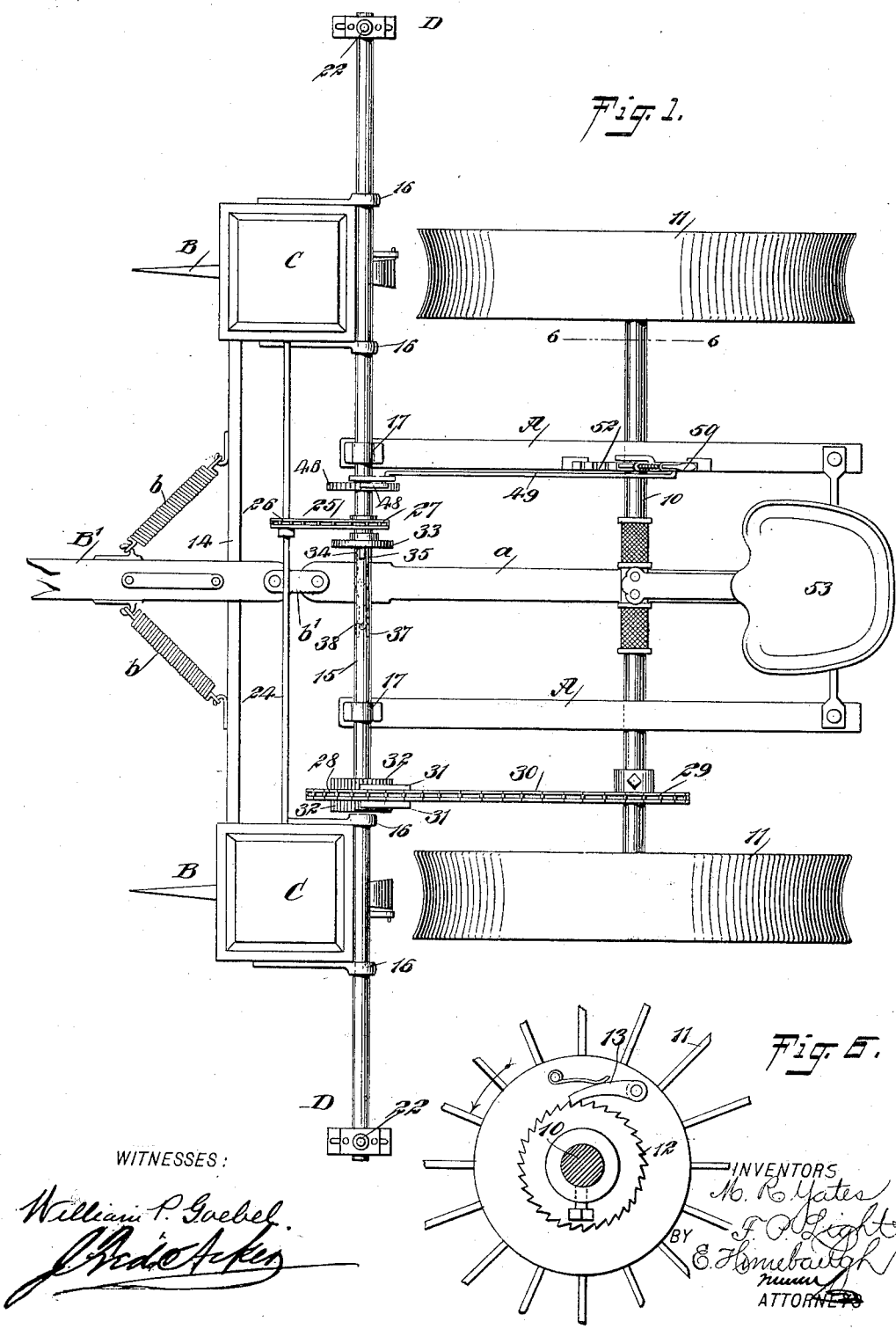
WITNESSES:
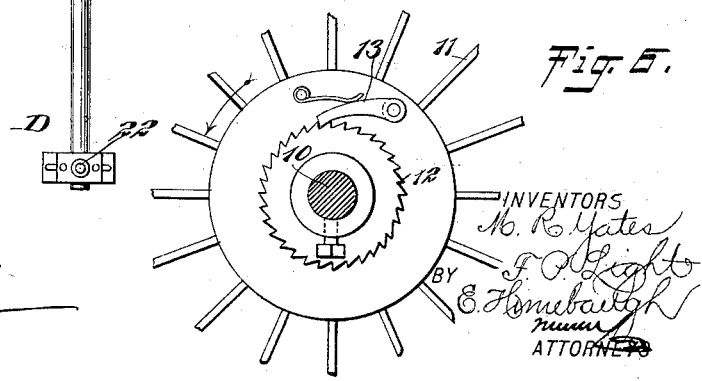

No. 652,577. Patented June 26, 1900.
M. R. YATES, F. P. LIGHT & E. HIMEBAUGH.
CORN PLANTER.
(Application filed Dec. 20, 1899.)
(No Model.) 2 Sheets—Sheet 2.
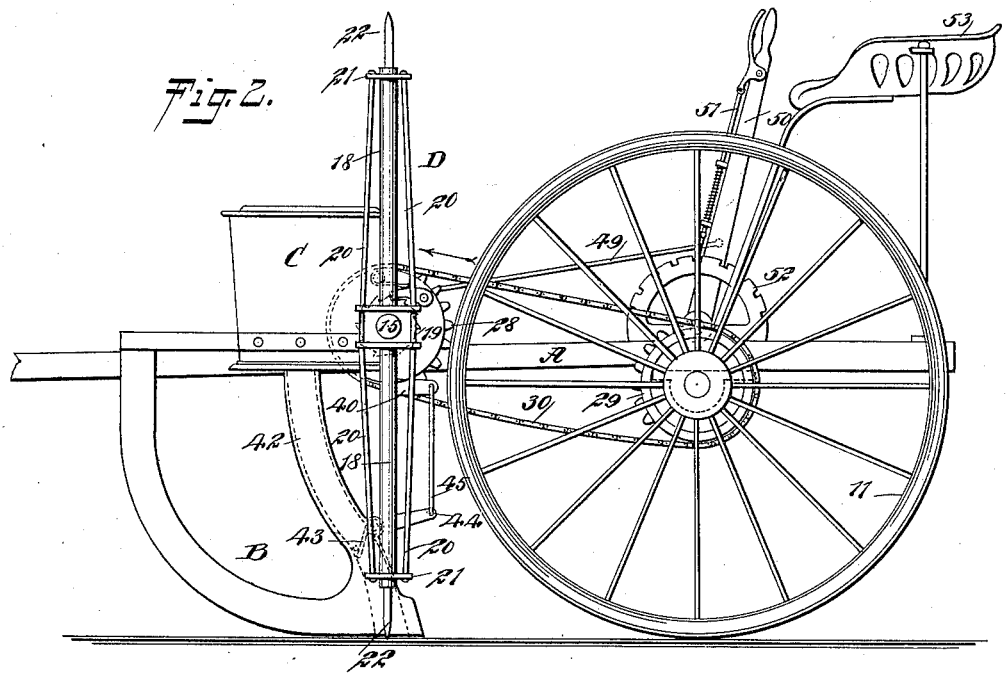
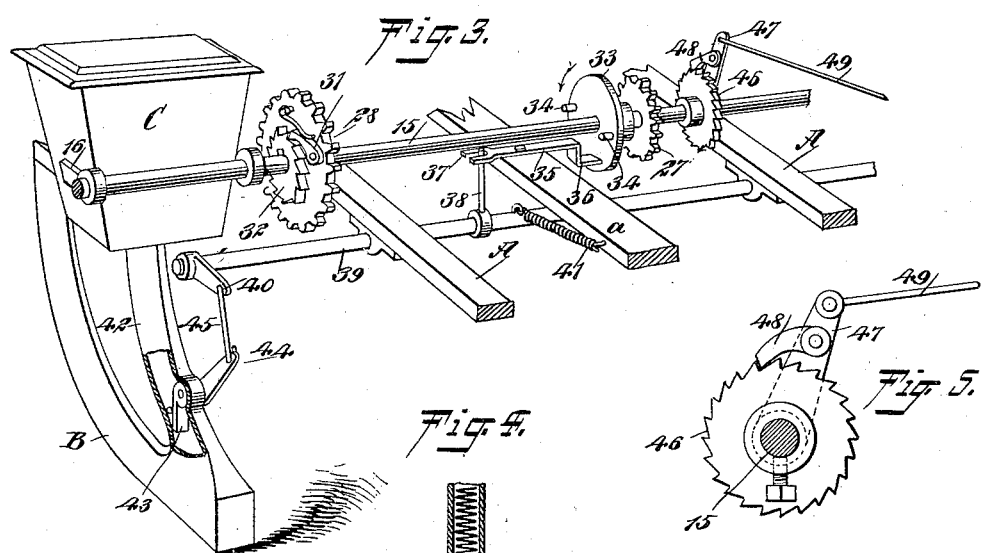
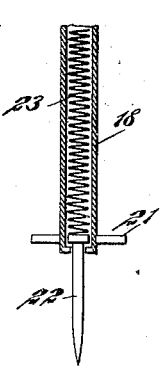

UNITED STATES PATENT OFFICE.

MARCUS REZIN YATES, FRANK P. LIGHT, AND ELLIOTT HIMEBAUGH, OF PENDLETON, OREGON.

CORN-PLANTER.

SPECIFICATION forming part of Letters Patent No. 652,577, dated June 26, 1900.

Application filed December 20, 1899. Serial No. 741,011. (No model.)

*To all whom it may concern:*

Be it known that we, MARCUS REZIN YATES, FRANK P. LIGHT, and ELLIOTT HIMEBAUGH, citizens of the United States, residing at Pendleton, in the county of Umatilla and State of Oregon, have invented a new and Improved Corn-Planter, of which the following is a full, clear, and exact description.

Our invention is an attachment to sulky corn-planting machines, one object being to provide a simple construction for the purpose of check-rowing or dropping the corn directly opposite each hill in the adjoining rows, so that the rows of corn stand crosswise as well as lengthwise of the field.

A further object of the invention is to so construct the attachment that all of the operative parts will be in front of the driver.

Another object of the invention is to provide a planter which may be operated without the aid or employment of a check wire or rope to drop the seed in perfect check and at the same time mark or indicate in such manner that the operator may readily determine if the machine is operating correctly without leaving his position on the seat of the planter.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved machine. Fig. 2 is a side elevation of the same. Fig. 3 is a perspective view of the forward portion of the machine, illustrating particularly the check mechanism and means for delivering the seed from the boot, a portion of the boot being in section. Fig. 4 is a vertical section through one end of the check-register. Fig. 5 is a transverse section through the check-shaft, illustrating the mechanism for turning the said shaft independent of the principal driving mechanism; and Fig. 6 is a transverse section through the axle, taken practically on the line 6 6 of Fig. 1.

The main frame A is of the usual construction, having forward runners or shoes B and a tongue B'. The frame A, which is provided with a reach or central bar $a$, is mounted upon an axle 10, on which wheels 11, having concaved tires, are loosely mounted. Ratchet-wheels 12 are secured to the axle, one adjacent to the hub of each supporting or drive wheel, and the teeth of these ratchet-wheels are engaged by spring-controlled dogs 13, carried by the hubs of the supporting-wheels 11, so that if one supporting or drive wheel slips the corresponding wheel will turn the axle and in backing the axle will not revolve.

The tongue or pole B' is connected by a link $b'$ with the forward end of the reach or central beam $a$ of the main frame, and springs $b$ are connected with opposite sides of the said tongue, which springs are likewise connected with a front cross-bar 14, the cross-bar being attached to seedboxes C of any suitable description, and these seedboxes are usually mounted on the runners or shoes B. The intention of the springs $b$ is to take the side motion from the machine caused by a team working unevenly.

A check-shaft 15 is journaled in bearings 16, extending rearward from the seedboxes C, as shown in Figs. 1 and 3, and the said check-shaft is likewise journaled in boxes or bearings 17, secured to the forward ends of the side bars of the main frame A. The check-shaft 15 extends at each end beyond the seedboxes, and at each end of the check-shaft a register D is secured. Each register comprises a tube 18 in two sections connected by a hub 19, the hub being secured to the check-shaft 15, and truss-bars 20, located at the opposite sides of the tube and extending from end plates 21, secured at the ends of the sections of the tube to an engagement with plates carried by the hub, as shown in Fig. 2. Each register D is completed by the addition of pins 22, located in the outer ends of the sections of the tube 18, which pins, as shown in Fig. 4, are provided with heads, preventing them from being withdrawn from the tubular sections of the register, and springs 23 are placed in the tubular sections of the register, bearing against the hub 19 and the heads of the pins 22. Thus as the register revolves and a pin is brought in engagement with the surface of the ground to produce a check or mark if the pin should have bearing against a stone or other unyielding surface it will not become broken, but will simply slide in its tubular carrier, and the spring 23 in such carrier will force the pin out to its normal position as soon as it is cleared from the obstruction.

A seed-drop shaft is employed, which operates in the seedbox in a similar manner to any rotary drop, and this rotary drop-shaft 24 is set in motion by a connection with the check-shaft 15, such connection consisting of a chain belt 25, passed over a sprocket-wheel 26 on the seed-drop shaft 24 and over a like wheel 27 on the check-shaft 15. The check-shaft is driven from the axle 10, and this is effected in the following manner: At preferably the left-hand side of the machine a sprocket-wheel 28 is loosely mounted on the check-shaft 15, and this wheel is connected with a sprocket-wheel 29 on the axle 10 through the medium of a chain belt 30 or its equivalent. The forward sprocket-wheel 28 is provided at each side with a spring-controlled forwardly-pointing dog 31, and these dogs engage with ratchet-wheels 32, secured to the check-shaft 15, being located adjacent to the side faces of the sprocket 28, as shown in Figs. 1 and 3. Thus when the machine is backed the check-shaft will not be revolved, and the machine may be turned without causing seed to be dropped.

An operating-wheel 33 is secured on the check-shaft 15, and this operating-wheel 33 is provided with two pins 34 upon its inner face, near its periphery. The pins are diametrically opposite or at equal distances apart and are parallel with the longitudinal axes of the registers D. This operating-wheel as it revolves operates a drop device consisting of a lever 35, fulcrumed upon the reach or center bar $a$ of the frame by a lag-screw or its equivalent. The said drop-lever is provided with a foot 36 at one end, adapted to be engaged by the pins 34 of the operating-wheel as said wheel revolves, thus rocking the lever 35. A fork 37 is formed at the opposite end of the lever 35, and the fork receives a pin 38, which is secured to a release-shaft 39. This shaft is journaled in suitable bearings located upon the under side of the main frame A, as shown in Fig. 3, and at each end of the release-shaft 39 a crank-arm 40 is secured, the crank-arms normally being in a horizontal position, pointing rearward. The shaft 39 is held in its normal position and restored to such position by means of a spring 41, attached to the shaft and to the reach or center bar $a$ of the main frame. The ordinary boots 42 are usually employed, extending from the seedboxes C and communicating with the openings in the runners, which openings are in communication with the ground.

Each boot 42 is provided with a vibrating valve 43, and these valves are not opened until a sufficient quantity of seed has accumulated in the boots to provide for planting a hill; but the seeds are preferably delivered singly to the boots from the boxes C. The valves 43 are opened when the crank-arms of the releasing-shaft 39 are rocked in a forwardly direction, as the said crank-arms are connected through links 45 with crank-arms 44, secured to the spindles of the valves. Thus whenever a pin 34 strikes the shifting lever 35 the said shifting lever rocks the release-shaft 39 against the tension of the spring 41 and causes the valves 43 to open, permitting the seed to drop to the ground into the furrows made by the runners B, and at the same time the pins 22 of the registers will enter the ground and indicate the spot where the seeds are to be dropped.

When the machine is to be turned, it is necessary that the registers should be brought to such position that their points will not enter the ground. To that end a ratchet-wheel 46 is secured upon the check-shaft 15, near its right-hand end, and an arm 47 is loosely mounted on the shaft at one side of the ratchet-wheel, the arm 47 carrying a slip-dog 48, adapted to engage with said ratchet-wheel 46, as shown in Figs. 3 and 5, and a connecting-rod 49 is carried from the arm 47 to a connection with a lever 50, fulcrumed upon the axle 10 or any desired support on the frame A, and this lever is provided with a thumb-latch 51, arranged to engage with a rack 52. Thus by manipulating the lever 51 the check-shaft may be turned and the register be brought to any desired position.

It is obvious that all the mechanism is in front of the driver, whose seat 53 is located at the rear of the frame, and that the registers D may be manipulated without necessitating the driver leaving his seat.

Having thus described our invention, we claim as new and desire to secure by Letters Patent—

1. In a corn-planter or like device, a wheel-supported frame, a tongue having pivotal connection with the frame, and tension devices connected with the tongue at opposite sides and with the frame, as described.

2. In a planter, a check-shaft, a drive-shaft connected with the check-shaft, means for turning the check-shaft independent of the drive-shaft, registers carried by the check-shaft, boots leading from seedboxes valves in the boots, and means for operating the valves from the check-shaft, as and for the purpose set forth.

3. In a planter, a drive-shaft, supporting-wheels having driving connection with the said shaft, a check-shaft driven from the drive-shaft, means for turning the check-shaft independent of the drive-shaft, a register secured to each end of the check-shaft, boots leading from seedboxes, a swinging valve in each boot and mechanism between the valves and check-shaft for operating the former from the latter, as set forth.

4. In a planter, the combination with an axle, supporting-wheels for the same, seedboxes, boots connected therewith, valves within the said boots and runners connected with the boots, of a check-shaft, a releasing-shaft below the check-shaft, said check-shaft being driven from the axle, a disk secured upon the check-shaft and provided with pins, parallel with the longitudinal axes of the registers, a trip-lever operated by the pins of the said disk, and a connection between the trip-lever and the releasing-shaft, and a connection between the releasing-shaft and the said valves, for the purpose described.

5. In a planter, the combination with a wheel-supported frame, a shifting lever carried by the frame, seedboxes and a seed-dropping mechanism carried by the frame, including boots and valves in the said boots, of a shaft driven from the axle of the wheel-supported frame, registering devices located at the outer ends of the said check-shaft, a driving connection between the check-shaft and the seed-dropping mechanism, a shifting connection between the lever carried by the said frame and the said check-shaft, a tension-controlled release-shaft actuated from the check-shaft, and a connection between the release-shaft and the valves in the boots, as set forth.

6. The combination with a frame, an axle-shaft, supporting-wheels arranged to turn the said axle, seedboxes, runners and boots therefor, valves located in the said boots, and a seed-drop mechanism, of a check-shaft extending beyond the boxes, registers secured to the ends of the check-shaft, and provided with tension-controlled points, and a driving connection between the check-shaft and the seed-dropping mechanism, a sprocket-wheel loosely mounted on the check-shaft, provided with dogs, ratchets secured to the check-shaft, arranged to be engaged by the said dogs, a belt connection between the said sprocket-wheel and the axle of the frame and a shifting connection between the said frame and the check-shaft, a disk secured to the check-shaft, provided with pins at equal distances apart and parallel with the longitudinal axes of the registers, a trip-lever adapted to be engaged by the said pins, a tension-controlled releasing-shaft, a connection between the said releasing-shaft and said shifting lever, and connections between the releasing-shaft and the valves in the said boots, for the purpose set forth.

7. In a planter, the combination with boots leading from seedboxes, and a revoluble shaft provided with registers at its ends, of swinging valves in the boots, a rock-shaft, connections between the rock-shaft and valves, and means for operating the rock-shaft from the shaft carrying the registers, substantially as described.

8. In a planter, the combination with boots leading from seedboxes, and a revoluble shaft provided with registers at its ends, of swinging valves in the boots having crank-arms on their spindles, a spring-pressed rock-shaft having crank-arms at its ends, links connecting the crank-arms of the shaft with crank-arms of the valves, and means for operating the rock-shaft from the shaft carrying the registers, substantially as described.

9. In a planter, the combination with boots leading from seedboxes, and valves in the boots, of a spring-pressed rock-shaft provided with a pin, connections between the rock-shaft and valves, a revoluble shaft carrying registers at its ends, a disk on the shaft and provided with pins, and a pivoted lever having one end forked to receive the pin of the rock-shaft and provided at its other end with a foot adapted to be engaged by the pins of said disk.

10. In a planter, the combination with seedboxes, a seed-drop shaft, boots leading from the seedboxes, and swinging valves in said boots, of a revoluble shaft provided with registers at its ends, means for operating the seed-drop shaft from the register-shaft, a rock-shaft, connections between the rock-shaft and valves in the boots, and means for operating the rock-shaft from the register-shaft, substantially as described.

11. In a planter, the combination with the axle, supporting-wheels thereon, seedboxes, a seed-drop shaft, boots leading from the seedboxes, and swinging valves in the boots, of a shaft provided with a register at each end, means for operating said shaft from the axle of the supporting-wheels, means for operating the seed-drop shaft from the register-shaft, a spring-pressed rock-shaft having its ends operatively connected with the swinging valves, and means for operating the rock-shaft from the register-shaft, substantially as herein shown and described.

In testimony whereof we have signed our names to this specification in the presence of the subscribing witnesses.

MARCUS REZIN YATES.
FRANK P. LIGHT.
ELLIOTT HIMEBAUGH.

Witnesses to signatures of Marcus Rezin Yates and Frank P. Light:
  L. B. REEDER,
  M. MOREHEAD.

Witnesses to signature of Elliott Himebaugh:
  JUSTIN GATES,
  W. E. BEST.